July 11, 1939. A. H. FLORETH 2,165,792
DOOR SPRING
Filed Jan. 18, 1938
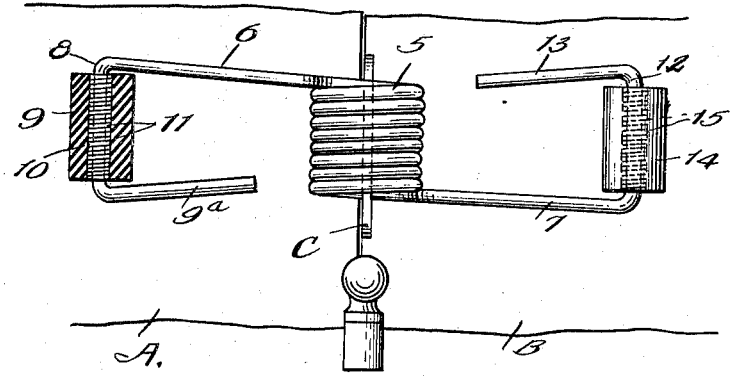
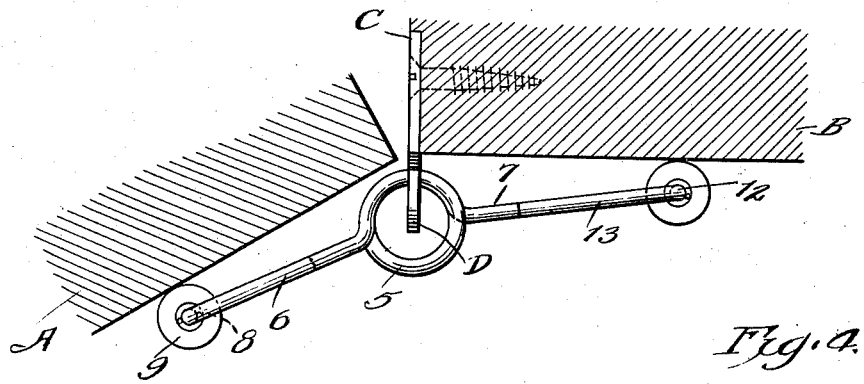
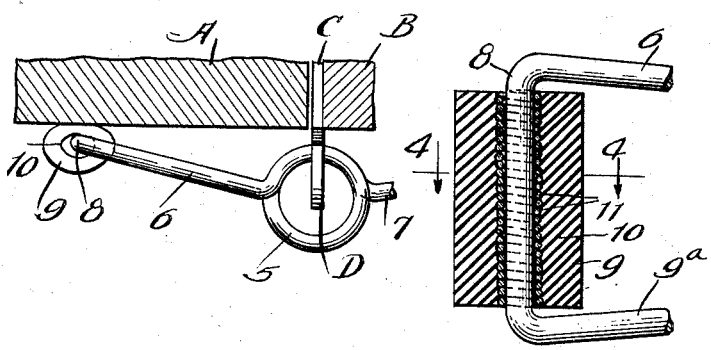 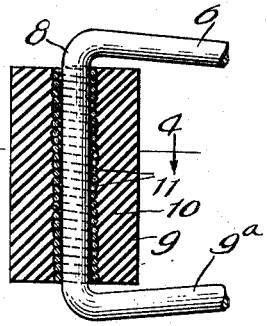 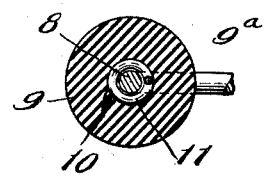 

Patented July 11, 1939

2,165,792

UNITED STATES PATENT OFFICE 2,165,792

DOOR SPRING

Alvin H. Floreth, Chicago, Ill., assignor to Gardner Wire Co., Chicago, Ill., a corporation of Illinois Application January 18, 1938, Serial No. 185,563

3 Claims. (Cl. 308—26)

My present invention relates to door springs and it has special reference to a spring that is adapted for closing a screen door. The article which I have devised consists of a coiled spring body with one or more radial arms the free end or ends of which are provided with means having rolling contact with the surface of the door or the door frame. This means is preferably a roller of rubber or other suitable material that prevents marring of the surface which it engages, and in order to insure an easy rolling action I have provided the roller with a novel bushing in order that the metal of which the arm is made will have a hard surface for engagement and will not cut or bite into the material of the roller.

I am aware that rollers have heretofore been mounted upon the arm or arms of door springs such as I have herein disclosed, and experience has shown that in a short time the constant movement caused by the opening and closing of the door will cause a distortion of the rubber roller so that it becomes flattened and soon will cease to rotate. I have also noted that in the use of structures of this character the metal arm or journal cuts into or grinds away the bore of the roller and will entirely destroy its usefulness in a short time. My experiments with my new type of article discloses the fact that the arm or journal will not distort the roller and will not cut into the rubber of which the roller is made. Furthermore, the bushing which I have provided affords a metal surface to contact the arm or journal thereby resulting in a freer movement of rotation of the roller. In order to reduce the friction between the two metal parts (the journal and the bushing) said bushing is made preferably of a coiled wire so that there is a continuous spiral "line-contact" between the bushing and the arm instead of a complete surface contact.

The principal object of my invention is to produce a door spring that is novel in construction and is capable of performing its functions in an effective and dependable manner. Other objects are to produce a device of this character that is easy to manipulate or install; is made of simple and sturdy parts so that it will withstand severe usage and will not readily get out of order; and is economical to produce so that it may be retailed for a reasonable price. Further objects and advantages of my invention will be apparent to persons skilled in the art after the construction and operation of my improved door spring is understood from the within disclosure.

I prefer to accomplish the objects of my invention and to practice the same in substantially the manner hereinbefore fully described and as more particularly pointed out in the claims. The accompanying drawing is referred to for a better understanding of the construction and operation of my invention, and said drawing, while more or less schematic discloses typical or preferred forms in which this device may be made.

In the drawing:

Figure 1 is a view showing my improved door spring, one of the rollers being in axial section.

Figure 2 is a plan of the device shown in Figure 1 showing the door ajar.

Figure 3 is an enlarged axial section of one of the rollers showing the spiral bushing therein.

Figure 4 is a horizontal or transverse section on line 4—4 of Figure 3.

Figure 5 is a detached view of the bushing.

Figure 6 shows the result of usage of a prior type of roller.

In the drawing, like reference characters identify the same parts wherever such parts appear in the different views. A designates a door at its hinged vertical edge and B designates the door frame or casing.

The means for mounting the spring preferably comprises a thin metal plate C, substantially rectangular in shape, that is inserted between the hinged edge of the door and the adjacent lateral surface of the frame and which is anchored to the latter by screws or other suitable means. The plate has an L-shaped extension D that protrudes beyond the meeting edges of the door and frame so that the vertical member of the extension provides an upright post and the lateral member provides an overhanging abutment. I make no claim herein to this mounting bracket as the same is fully described and claimed in the co-pending application for United States Letters Patent for a "Door spring" in the name of Fred E. Snyder, filed July 6, 1936, Serial No. 89,040.

My improved door spring embodies a length of wire of any suitable gage, the intermediate portion of which is wound into a cylindrical coil 5 with the convolutions preferably contacting each other. At the opposite ends of the coil 5 the wire is formed into radially disposed arms 6 and 7. If desired however a single arm may be employed at one end of the coiled body while the other end portion of the wire is suitably shaped to provide a substantial anchor.

The arm 6 is provided with a downwardly disposed extension 8 forming a vertical journal for the bored roller element 9 which is made of rubber or other suitable material, and below this roller the wire is bent laterally backward towards the lower end of the coiled body 5 to provide a retainer 9a for maintaining the roller upon its journal. When in use, this roller is urged, by the tension of the spring coil, against the front surface of the door as shown in Figures 1 and 2 and is adapted for rolling movement thereon.

On account of a considerable amount of friction being created between the journal member 8 and the surface of the bore 10 of rubber roller said bore rapidly wears and the walls of the roller become thinned, causing the roller to become flat-sided and distorted substantially in the manner illustrated in Figure 6. In order to overcome this inherent characteristic I interpose a metal bushing 11 between the journal member 8 and the roller 9. This bushing 11 is cylindrical in shape and preferably is a coil of wire of relatively small gage. The outside diameter of the coil is substantially the same as the diameter of the bore 10 of the roller so that it will be frictionally held in place, and the inside diameter of this coiled wire bushing is only slightly more than the thickness of the wire forming the journal member 8 to permit free movement of the roller and bushing upon the journal. The coiled wire bushing reduces friction between the movable parts because of the fact that the journal engages only the adjacent edges of the convolutions by a spiral "line-contact". Due to the relative dimensions of the bore of the roller and the outside diameter of the bushing, the latter fits tightly in said bore, and furthermore, on account of the elasticity of the material of which the roller is made, said material will enter the continuous spiral groove between the convolutions of the wire forming the bushing coil to assist in maintaining the bushing in position.

When the spring coil 5 is provided with a second arm 7 in addition to the arm 6 above described, said arm 7 projects radially from the end of the spring opposite arm 6, and it is provided with a vertical extension that provides a journal member 12 and a backwardly bent portion providing a retainer 13 that projects towards the coil 5. A roller 14 of rubber surrounds the journal member 12 and a coiled wire bushing 15 is interposed between the roller and its journal. This roller 14 is adapted for engagement with the front face of the door-frame or casing B in the manner shown in Figures 1 and 2.

In order to mount the door spring, the coil 5 is inserted over the upright portion or post of the extension D of the mounting plate so that the abutment or stop at the top of said post overhangs the upper convolution of the coil to retain the spring in proper position in the manner shown in the drawings.

What I claim as new is:

1. In a device of the kind described a roller of cushion material; a journal therefor; and a coiled wire bushing interposed between and in contact with said roller and journal whereby said journal is prevented from contacting the cushion material of said roller, and a spiral line-contact bearing is provided between said bushing and journal.

2. In a device of the kind described a cylindrical rubber roller having a central bore; a journal extending through said bore and about which said roller rotates, said journal disposed in non-contacting relation to said roller; and a spiral bushing in said bore separating said journal from said roller and rotatable with said roller, said bushing formed of a coiled wire whereby to provide a continuous line-contact with said journal.

3. In a device of the kind described a rotatable roller of cushion material having an axial bore; a hollow cylindrical bushing within said roller, said bushing embodying a spirally coiled wire the inner face of which constitutes a bearing; and a journal extending through said roller in engagement with said bushing; said spiral wire providing a spiral line-contact with said journal and also maintaining said journal out of contact with said roller.

ALVIN H. FLORETH.